United States Patent
Munguia

(10) Patent No.: US 7,609,723 B2
(45) Date of Patent: Oct. 27, 2009

(54) PACKET COMBINING ON PCI EXPRESS

(75) Inventor: Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/444,164

(22) Filed: May 23, 2003

(65) Prior Publication Data

US 2004/0233933 A1    Nov. 25, 2004

(51) Int. Cl.
*H04J 3/24* (2006.01)
(52) U.S. Cl. ...................................... 370/473
(58) Field of Classification Search ......... 370/229–240, 370/253, 264–271, 276, 310.1, 312, 313, 370/327, 335, 336, 340–546
See application file for complete search history.

(56) References Cited

U.S. PATENT DOCUMENTS

| | | | |
|---|---|---|---|
| 5,781,541 A * | 7/1998 | Schneider | 370/335 |
| 5,859,853 A | 1/1999 | Carlson et al. | |
| 6,003,089 A * | 12/1999 | Shaffer et al. | 709/233 |
| 6,009,488 A | 12/1999 | Kavipurapu | |
| 6,370,161 B1 * | 4/2002 | Ehrlich et al. | 370/516 |
| 6,631,434 B1 * | 10/2003 | Johnson et al. | 710/260 |
| 6,785,241 B1 * | 8/2004 | Lu et al. | 370/241 |
| 6,829,670 B1 | 12/2004 | Nakamura | |
| 7,024,510 B2 * | 4/2006 | Olarig | 710/311 |
| 7,142,540 B2 * | 11/2006 | Hendel et al. | 370/392 |
| 2001/0055317 A1 | 12/2001 | Kajizaki et al. | |
| 2003/0137993 A1 * | 7/2003 | Odman | 370/468 |
| 2003/0187938 A1 * | 10/2003 | Mousseau et al. | 709/206 |
| 2004/0085910 A1 * | 5/2004 | Wang | 370/252 |
| 2004/0103333 A1 * | 5/2004 | Martwick et al. | 713/400 |
| 2004/0213291 A1 * | 10/2004 | Beshai et al. | 370/473 |

FOREIGN PATENT DOCUMENTS

| | | |
|---|---|---|
| EP | 1404058 A2 | 3/2004 |
| JP | 01200739 | 8/1989 |
| JP | 2001-142845 | 5/2001 |
| JP | 2002-9832 | 1/2002 |
| KR | 2000-16812 | 5/2000 |

OTHER PUBLICATIONS

NEC Corp., *Patent Abstracts of Japan*, vol. 13, No. 503 (E-844), Nov. 13, 1989.
Office Action mailed Mar. 31, 2008 in Korean Patent Application No. 10-2005-7022321.

\* cited by examiner

*Primary Examiner*—Chirag G Shah
*Assistant Examiner*—Joshua Smith
(74) *Attorney, Agent, or Firm*—Blakely, Sokoloff, Taylor & Zafman LLP

(57) ABSTRACT

A method and device for combining packets is disclosed. In various embodiments, a plurality of packets that are compliant with a particular protocol are combined into a single packet of the same protocol. The single packet also preserves identification information for each of the combined packets within the single packet. The identification information can be used to partition and/or route the combined packets to their respective destinations.

22 Claims, 5 Drawing Sheets

PACKET COMBINING ON PCI EXPRESS

FIELD

The embodiments disclosed herein relate generally to packet transmission, and more particularly to combining packets prior to transmission.

BACKGROUND

Data can be sent in many different forms in a computer system or between computer systems (e.g., over a network). In some systems, data is grouped together and sent as a packet. PCI Express (Peripheral Component Interconnect Special Interest Group's Peripheral Component Interconnect Express 1.0 specification, published Jul. 22, 2002) is one example of a protocol for packetizing and transmitting data. Regardless of the protocol being used, the transmission of packets requires some level of overhead and minimum packet size.

For example, some packets require a header (e.g., overhead) that contains information regarding the contents and/or destination of the packet. If a minimum packet size is required before sending the packet, some systems will "stuff" additional bits into a packet that does not meet the minimum size requirement. The stuffed bits contain no useful information and reduce the efficiency of the system.

Following are some examples of PCI Express transactions that typically require bit stuffing to meet minimum packet size requirements. First, a simple sequence to an IO-mapped (e.g., input/output mapped) device requires an 8-bit IO write transaction to an index register followed by an 8-bit IO cycle to the corresponding data register. This translates into two full PCI Express transactions, both of minimum length and efficiency.

Second, reading a FIFO (e.g., first-in, first-out) or doorbell register consists of reading the same address repeatedly with a separate PCI Express transaction each time. Third, some special memory transactions (e.g., programming a flash memory device) require byte or word writes in command sequence order. Each of these writes requires a separate PCI Express transaction.

Thus, each of these three processes require multiple PCI Express transactions of minimum length, which is likely to involve the inefficient transmission of useless bits due to bit stuffing. Moreover, each additional PCI Express transaction requires system resources in order to form packets, to transmit packets, and to acknowledge packet transmission.

The drawbacks of packet overhead and minimum packet size are particularly noticeable in situations where data traffic is primarily routed to low bandwidth peripheral devices and IO devices since utilization of these devices can be low. Low utilization translates into wasted power, particularly in low power systems. For switches, low utilization can result in inefficient performance and arbitration inefficiencies.

DESCRIPTION OF THE DRAWINGS

Various embodiments are illustrated by way of example and not by way of limitation in the figures of the accompanying drawings in which like references indicate similar elements. It should be noted that references to "an," "one," "the," "other," "alternative," or "various" embodiments in this disclosure are not necessarily to the same embodiment, and such references mean at least one.

DETAILED DESCRIPTION

In the following description, for the purposes of explanation, numerous specific details are set forth in order to provide a thorough understanding of the various embodiments. It will be apparent to one skilled in the art that the embodiments may be practiced without some of these specific details. In other instances, certain structures and devices are omitted or simplified in order to avoid obscuring the details of the various embodiments.

The following description and the accompanying drawings provide examples for the purposes of illustration. However, these examples should not be construed in a limiting sense as they are not intended to provide an exhaustive list of all possible implementations.

Various methods disclosed herein can be implemented by using a machine to read instructions stored on a machine-readable medium and to perform functions in accordance with those instructions. A machine-readable medium includes any mechanism that provides (e.g., stores) information in a form readable by a machine (e.g., a computer). For example, a machine-readable medium includes read only memory (ROM); random access memory (RAM); magnetic disk storage media; optical storage media; flash memory devices.

Figure 1:
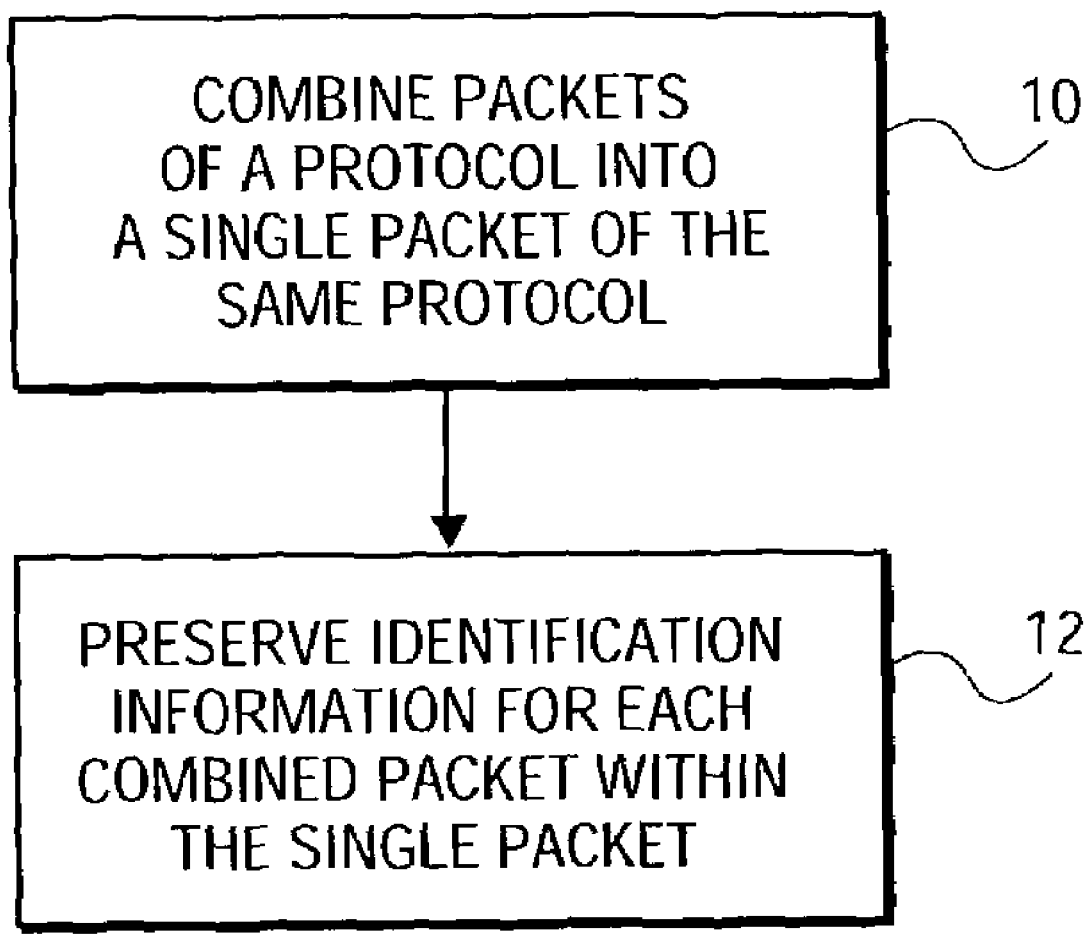
FIG. 1 is a flow chart for one embodiment of a method for combining a plurality of packets into a single packet.

Referring now to FIG. 1, a method for combining packets is shown. At block 10, a plurality of packets that are compliant with a particular protocol (e.g., PCI Express) are combined into a single packet. The single packet is compliant with the same protocol as the plurality of combined packets.

Identification information for each of the combined packets is preserved in the single packet, at block 12. In various embodiments, the preservation of identification information includes maintaining the headers of each of the combined packets within the single packet. In one embodiment, the preservation of identification information occurs simultaneously with the combining of packets.

Figure 2:
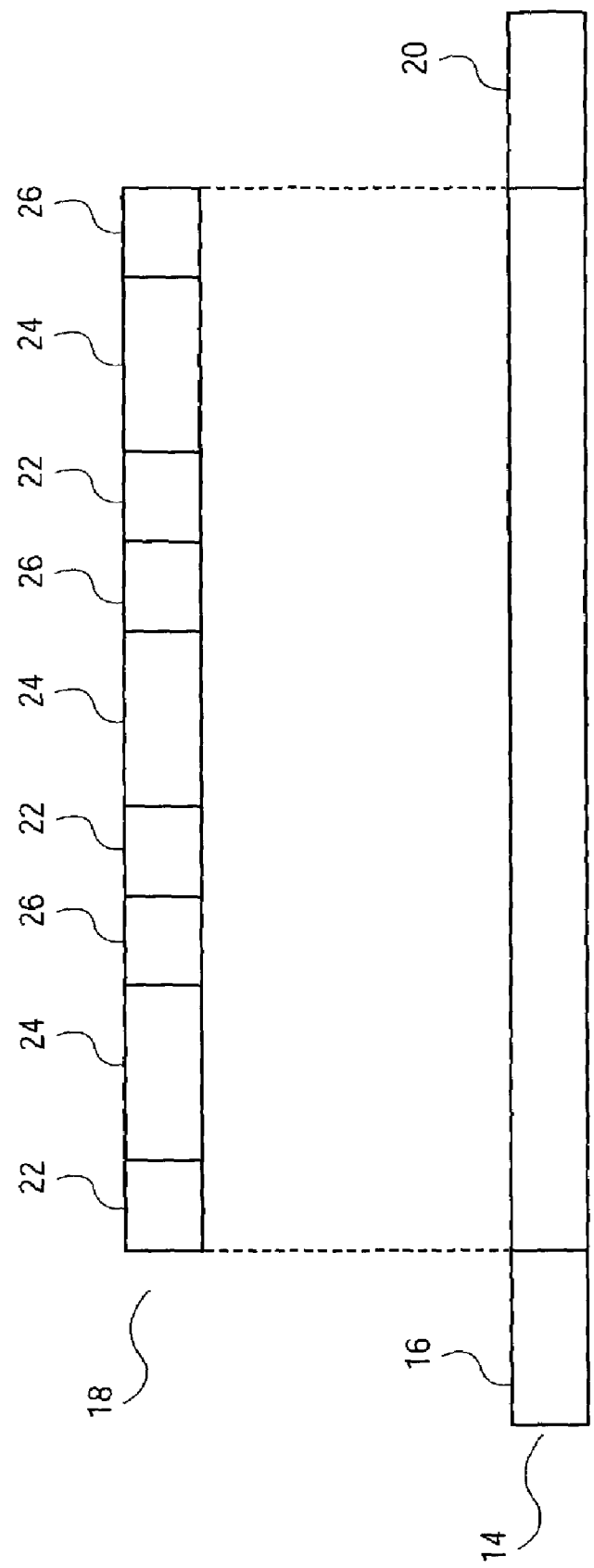
FIG. 2 shows one embodiment of a packet that contains multiple combined packets.

FIG. 2 shows an example of a single packet containing several combined packets. Specifically, single packet 14 includes header 16, combined packets 18, and cyclic redundancy check ("CRC") 20. In various embodiments, header 16 contains an indication that single packet 14 contains combined packets 18. In other embodiments, the indication that single packet 14 contains combined packets 18 may be located elsewhere (e.g., in other fields) within single packet 14.

Each combined packet 18 includes header 22, data field 24, and CRC 26. Combined packets 18 may be identical to each other or distinct from one another. For example, PCI Express utilizes different types of packets, which are transaction dependent, and may be combined in any manner since the various embodiments place no restrictions on the manner in which different packet types may be combined within the single packet.

Although not shown in FIG. 1, various embodiments of the method can include additional features. For example, once the single packet is created, the single packet can be sent to a device capable of combining and partitioning packets. In one embodiment, the single packet could be sent over a PCI Express bus. The receiving device can be, for example, a PCI Express root device, a PCI Express switch, or a PCI Express peripheral device. Examples of a PCI Express peripheral device include, among others, IO devices such as Gigabit Ethernet and Accelerated Graphics Port.

If the receiving device is a switch, several different events can occur. For example, once the switch receives the single packet, the switch may simply route or send the single packet to another device. Alternatively, the switch can partition the single packet (e.g., extract the combined packets) and send the extracted packets to an appropriate destination.

In various embodiments, the switch uses the header of the single packet to determine whether to re-route the single packet or whether to begin extracting the combined packets. If the packets are extracted, the switch can use the headers of the extracted packets (e.g., that were previously preserved) to determine where each extracted packet should be sent.

However, if the receiving device is a peripheral device, the single packet would simply be received and the combined packets extracted for use/transmission by the peripheral device.

The method shown in FIG. 1 can also be extended by coordinating the combining with the resynchronization of a communications link. For example, in PCI Express, links between devices can be set to power down based on some threshold criteria (e.g., predetermined period of inactivity of the link). When the link is signaled to power up in order to receive/transmit data, the link must resynchronize. Necessarily, there is a period of latency between the indication that the link should be powered up and the completion of resynchronization.

Various embodiments take advantage of this inherent latency period by combining packets prior to and/or during resynchronization of the link. In other embodiments, resynchronization is intentionally delayed. The additional latency caused by an intentional delay advantageously allows additional time for the combining of packets.

Figure 3:
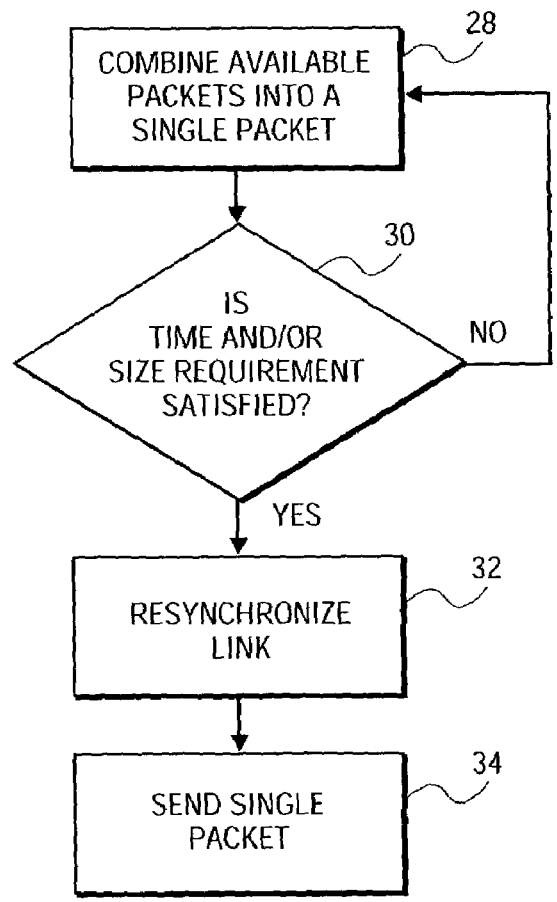
FIG. 3 is a flow chart for one embodiment of a method for delaying resynchronization of a link until combining of packets into a single packet is complete.

In this regard, FIG. 3 is a flow chart of one embodiment of a method for intentionally delaying resynchronization. At block 28, available packets are combined into a single packet. At decision block 30, it is determined whether a pre-determined fixed amount of time has elapsed and/or a minimum combined packet size threshold has been satisfied. If the required condition or conditions have not been satisfied, the combining of packets continues at block 28. If, however, the necessary condition or conditions have been met, resynchronization of the link proceeds, at block 32. Once the link is resynchronized, the single packet is sent, at block 34.

Figure 4:
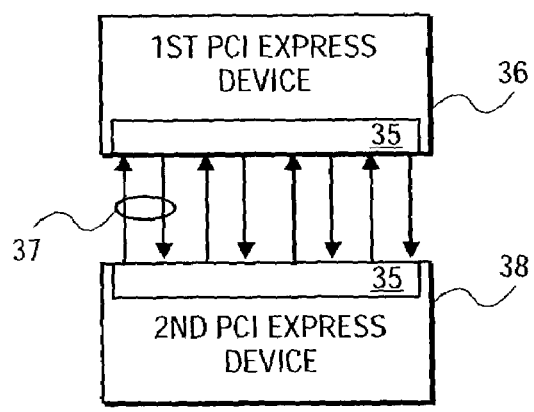
FIG. 4 is a diagram of a first PCI Express device coupled to a second PCI Express device, each device capable of combining and partitioning packets, according to the various embodiments disclosed herein.

FIG. 4 shows a simplified diagram of two devices that can be used to perform some of the various methods described above. Specifically, first PCI Express device 36 is coupled to second PCI Express device 38. As stated above, each device can be one of the following: a PCI Express root device, a PCI Express switch device, and a PCI Express peripheral device.

In one embodiment, device 36 (and possibly device 38) is capable of combining a plurality of packets that are compliant with PCI Express into a single packet that is compliant with PCI Express and contains identification information for each of the combined packets. Device 36 is also capable of sending the single packet over a PCI Express link to device 38.

Device 38 is capable of routing the single packet, received from device 36, to another PCI Express device; extracting the combined packets from the single packet; and sending the extracted packets to an appropriate destination. In various embodiments, the appropriate destination is determined by the header of the single packet and/or the header for each of the combined packets within the single packet.

Device 36 and device 38 each include port 35, which is a group of related transmitters and receivers. In various embodiments, ports 35 should have matching capabilities (e.g., both ports 35 should be able to combine and partition packets in both an upstream and a downstream direction, as necessary). In the embodiment shown, there are four lanes 37 between device 36 and device 38. A "lane" is a set of differential transmit and receive pairs. The term "link" (e.g., PCI Express link) as used herein refers to two (or more) ports and their interconnecting lanes.

Figure 5:
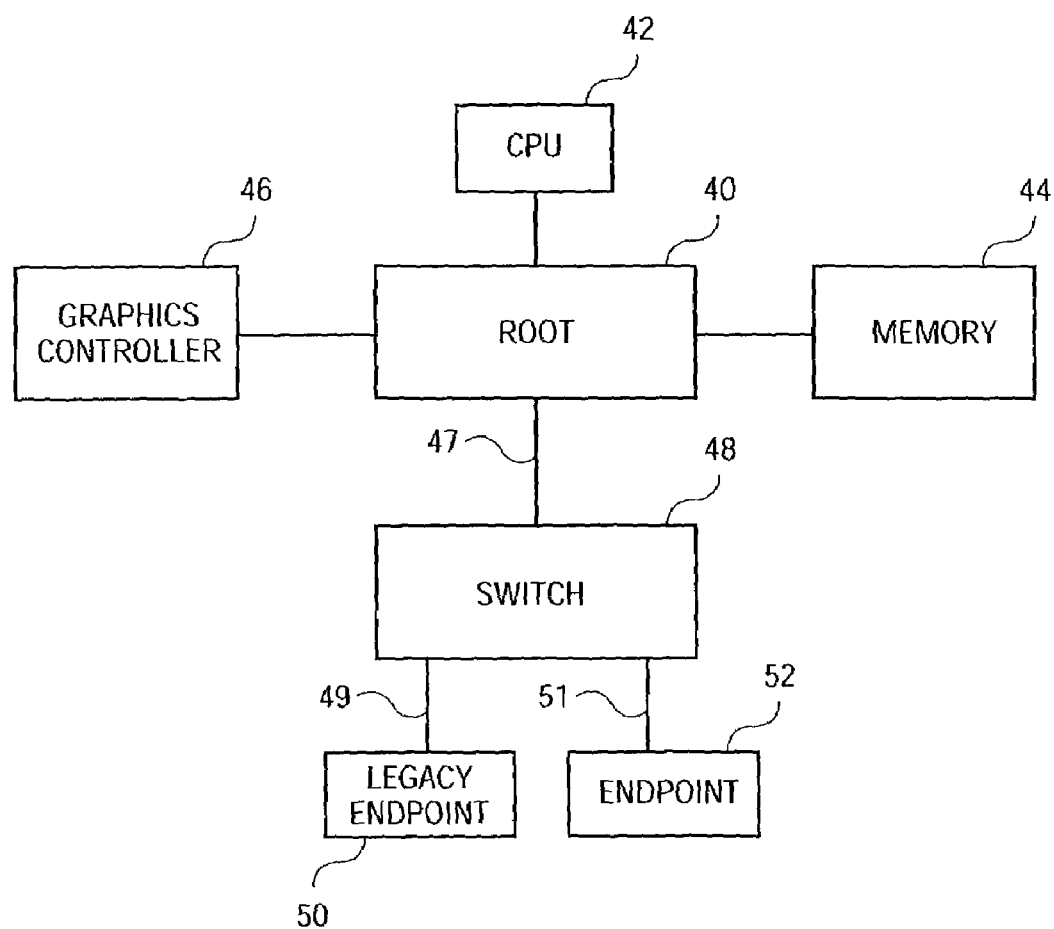
FIG. 5 is a system including multiple PCI Express devices capable of combining and partitioning packets.

FIG. 5 shows a system that includes graphics controller 46, a first PCI Express device (e.g., root 40) coupled to graphics controller 46, and a second PCI Express device (e.g., switch 48). The system also includes central processing unit ("CPU") 42 coupled to root 40, memory 44 coupled to root 40, legacy endpoint 50 coupled to switch 48, and endpoint 52 coupled to switch 48. Although root 40 is shown as a single element in FIG. 5, root 40 may comprise a memory controller hub (e.g., north bridge coupled to CPU 42, graphics controller 46, and memory 44) and an IO controller hub (e.g., south bridge coupled to the north bridge and to switch 48).

Root 40 and switch 48 are capable of implementing the methods described above (e.g., combining, partitioning, and routing packets). Likewise, endpoint 52 is also capable of implementing the previously described methods. However, legacy endpoint 50 is not capable of combining and partitioning packets.

Figure 6:
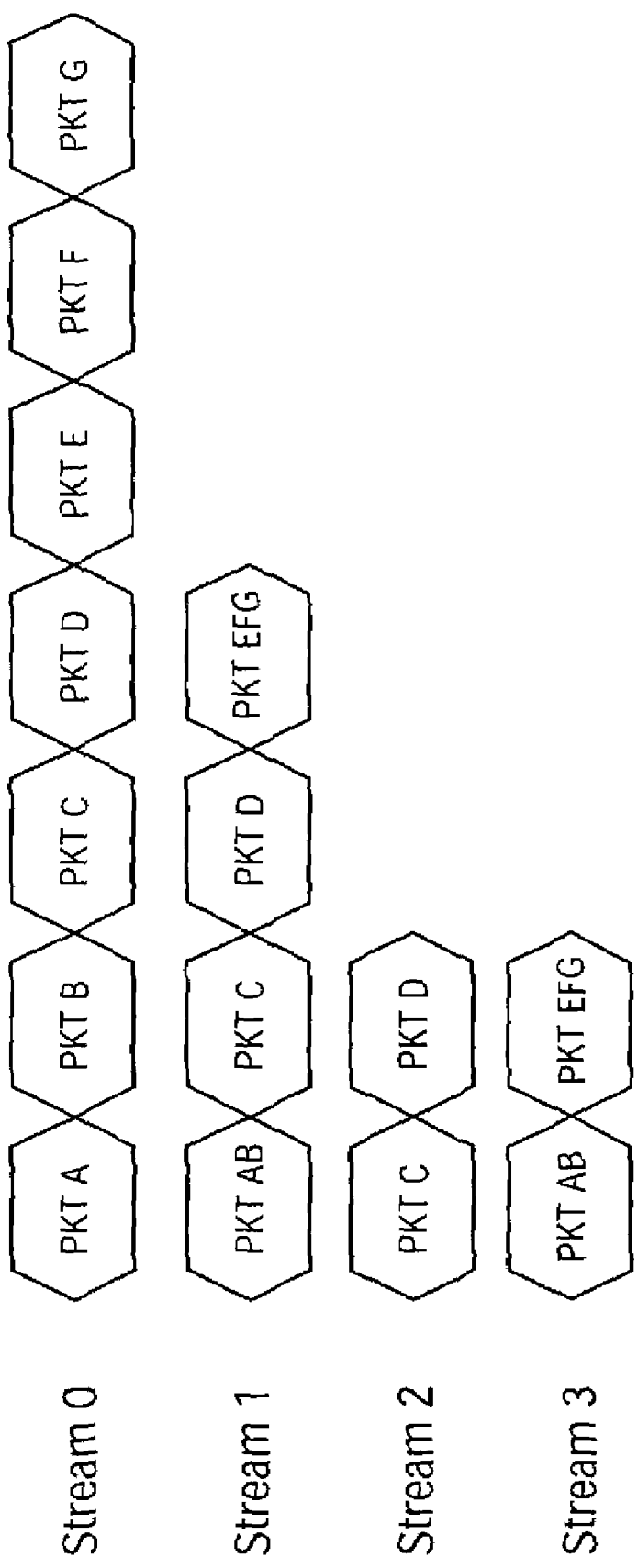
FIG. 6 is a diagram of different data streams based on the enablement of the combining function of the devices in the system of FIG. 5.

FIG. 6 shows different data streams based on the enablement of the combining function of the devices in the system of FIG. 5. For example, if combining is disabled on root 40, the packet stream on line 47 would appear as Stream 0 in FIG. 6 (e.g., each packet sent separately). Most likely, the separate transmission of each packet would necessitate bit stuffing, described above, to meet the minimum packet size for transmission.

However, if packet combining is enabled on root 40, switch 48, and endpoint 52, the packet stream on line 47 would appear, for example, as Stream 1 of FIG. 6, with multiple packets appropriately combined based on size, destination, and the combining capability (and/or enablement) of the destination device. Switch 48 routes the received packets based on their appropriate destination. In the case with packets appearing as in Stream 1, non-combined packets C and D are destined for legacy endpoint 50, and the packets combined to contain AB and EFG are destined for endpoint 52. Thus, the packet stream on line 49 would appear as Stream 2 (e.g., no combined packets) of FIG. 6, and the packet stream on line 51 would appear as Stream 3 of FIG. 6.

By utilizing the methods and devices disclosed herein, the efficiency of certain PCI systems can be increased between 5-10% over conventional systems that do not combine packets. Among other advantages, when the various embodiments disclosed herein are used in a chipset south bridge, port utilization is greatly increased, which permits more bandwidth to be used for high traffic peripherals in the same device.

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

I claim:

1. A method comprising:
combining a plurality of packets that are compliant with a local computer-bus interconnect protocol into a single packet that is compliant with the same protocol;
preserving identification information for each of the combined packets within the single packet;
adding an indication to the single packet to indicate that the combined packets are contained within the single packet, wherein combining is performed during at least one of a time (i) prior to resynchronization of a Peripheral Component Interconnect ("PCI") Express link, and (ii) during resynchronization of a PCI Express link;
increasing efficiency of sending data in the plurality of packets or increasing the port utilization of a port used to send the plurality of packets; and
delaying resynchronization by a PCI Express device of a PCI Express link based on at least one of a fixed amount of time and satisfying a minimum combined packet size threshold required for transmission on the link.

2. The method of claim 1, wherein adding comprises:
attaching a header to the single packet.

3. The method of claim 1, further comprising:
sending the single packet to a device capable of combining and partitioning packets;
saving power required to send the plurality of packets; and
reducing stuffing involved to send the plurality of packets according to the protocol.

4. The method of claim 3, further comprising:
receiving the single packet; and
sending the single packet to another device.

5. The method of claim 3, further comprising:
receiving the single packet; and
extracting the combined packets.

6. The method of claim 5, further comprising:
sending each extracted packet to an appropriate destination.

7. The method of claim 1, further comprising:
saving power of the link by intentionally performing the delaying.

8. An apparatus comprising:
a first Peripheral Component Interconnect ("PCI") Express device
combining a plurality of packets that are compliant with PCI Express into a single packet that is compliant with PCI Express, the single packet to contain identification information for each of the combined packets within the single packet and a header to indicate that the combined packets are contained within the single packet,
sending the single packet over a PCI Express link; and
intentionally delaying resynchronization of the link by delaying sending the single packet to save line power;
reducing stuffing required to send the plurality of packets over the link; and
a second PCI Express device to receive the single packet.

9. The apparatus of claim 8, wherein the first PCI Express device comprises one of a PCI Express root device, a PCI Express switch device, and a PCI Express peripheral device, and the second PCI Express device comprises one of a PCI Express root device, a PCI Express switch device, and a PCI Express peripheral device.

10. The apparatus of claim 8, wherein the second PCI Express device is capable of at least one of (i) routing the single packet to another PCI Express device, (ii) extracting the combined packets from the single packet, and (iii) sending the extracted packets to a destination determined by a header of each extracted packet.

11. A system comprising:
a graphics controller;
a first Peripheral Component Interconnect ("PCI") Express device coupled to the graphics controller, the first PCI Express device
combining a plurality of packets that are compliant with PCI Express into a single packet that is compliant with PCI Express, the single packet to contain identification information for each of the combined packets within the single packet and a header to indicate that the combined packets are contained within the single packet,
sending the single packet over a PCI Express link; and
intentionally delaying resynchronization of the link by delaying sending the single packet to save line power;
reducing stuffing required to send the plurality of packets over the link; and
a second PCI Express device to receive the single packet.

12. The system of claim 11, wherein the first PCI Express device comprises one of a PCI Express root device, a PCI Express switch device, and a PCI Express peripheral device, and the second PCI Express device comprises one of a PCI Express root device, a PCI Express switch device, and a PCI Express peripheral device.

13. The system of claim 11, wherein the second PCI Express device is capable of at least one of (i) routing the single packet to another PCI Express device, (ii) extracting the combined packets from the single packet, and (iii) sending the extracted packets to a destination determined by a header of each extracted packet.

14. A machine-readable medium containing instructions that, when executed by a machine, cause the machine to perform operations comprising:
combining a plurality of packets that are compliant with a local computer-bus interconnect protocol into a single packet that is compliant with the same protocol;
preserving identification information for each of the combined packets within the single packet;
adding an indication to the single packet to indicate that the combined packets are contained within the single packet;
delaying resynchronization of a Peripheral Component Interconnect Express link based on at least one of a fixed amount of time and satisfying a minimum combined packet size threshold required for transmission on the link; and
saving power of the link by intentionally performing the delaying.

15. The machine-readable medium of claim 14, wherein adding an indication comprises:
attaching a header to the single packet.

16. The machine-readable medium of claim 14, wherein the operations further comprise:
sending the single packet to a device capable of combining and partitioning packets.

17. The machine-readable medium of claim 16, wherein the operations further comprise:
receiving the single packet; and sending the single packet to another device.

18. The machine-readable medium of claim 16, wherein the operations further comprise:
   receiving the single packet; and
   extracting the combined packets based on the identification information.

19. The machine-readable medium of claim 18, wherein the operations further comprise:
   sending each extracted packet to a destination determined by a header of each extracted packet.

20. The machine-readable medium of claim 14, wherein combining is performed during at least one of a time (i) prior to resynchronization of a Peripheral Component Interconnect ("PCI") Express link, and (ii) during resynchronization of a PCI Express link.

21. The method of claim 1, wherein the local computer-bus interconnect protocol is a point-to-point protocol.

22. The method of claim 1, wherein the single packet is of at least a minimum size required for transmission.

* * * * *

UNITED STATES PATENT AND TRADEMARK OFFICE
CERTIFICATE OF CORRECTION

| | | |
|---|---|---|
| PATENT NO. | : 7,609,723 B2 | Page 1 of 1 |
| APPLICATION NO. | : 10/444164 | |
| DATED | : October 27, 2009 | |
| INVENTOR(S) | : Peter R. Munguia | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1412 days.

Signed and Sealed this

Twelfth Day of October, 2010

David J. Kappos
*Director of the United States Patent and Trademark Office*